United States Patent [19]

Seachman et al.

[11] 4,392,142

[45] Jul. 5, 1983

[54] INK JET DROPLET SENSING METHOD AND APPARATUS

[75] Inventors: Ned J. Seachman, Penfield; Edgar E. Price, Webster, both of N.Y.

[73] Assignee: Xerox Corporation, Stamford, Conn.

[21] Appl. No.: 358,400

[22] Filed: Mar. 15, 1982

[51] Int. Cl.[3] .......... G01D 15/18

[52] U.S. Cl. .......... 346/1.1; 346/75; 346/140 R

[58] Field of Search .......... 346/1.1, 75, 140

[56] References Cited

U.S. PATENT DOCUMENTS

| | | | |
|---|---|---|---|
| 3,633,035 | 6/1972 | Uchida | 250/199 |
| 3,925,727 | 12/1975 | Duguay | 324/121 R |
| 4,255,754 | 3/1981 | Crean et al. | 346/75 |
| 4,260,883 | 4/1981 | Onoda et al. | 250/226 |
| 4,272,189 | 6/1981 | Bailey et al. | 356/28 |
| 4,364,055 | 12/1982 | Aiba | 346/1.1 |

*Primary Examiner*—Donald A. Griffin

*Attorney, Agent, or Firm*—John E. Beck; Stephen J. Schultz

[57] ABSTRACT

An ink jet printer having improved droplet sensing apparatus for calibrating the printer. The improved apparatus defines a number of sensing sites each having first and second light sources for directing light signals through a sensing zone and a single fiber optic light pipe leading away from the sensing zone to circuitry for detecting the presence of ink droplets in that sensing zone. The preferred apparatus includes two light emitting diodes, each of which generate visible light signals of different wavelengths. These two light signals are received by an output light pipe and travel together along the right pipe to means for detecting the intensity of the two signals and determining droplet positioning in the sensing zone as a function of the two intensities. One apparatus for differentiating between the two light intensities comprises first and second photo detectors which respond to the wavelength light generated by the two light sources. The output from these two detectors are then routed to a difference amplifier which gives an indication of droplet position as a function of time. A second way of sensing the intensities is to time multiplex the sources so that only one source illuminates the droplet at a given time. These intensities are then stored in a sample and hold circuit and compared with a difference amplifier in a manner identical to the multiple wavelength sensing embodiment.

11 Claims, 4 Drawing Figures

INK JET DROPLET SENSING METHOD AND APPARATUS

BACKGROUND OF THE INVENTION

1. Field of the Invention

The present invention relates to ink jet printing and more particularly relates to an improved ink droplet sensing method and apparatus.

2. Background

Ink jet printing is a form of non-impact printing where ink droplets are squirted through an orifice and directed to specific locations on a print medium to create an information pattern on the print medium. U.S. Pat. No. 3,596,275 to Sweet discloses one such printing system where a sequence of droplets are generated, charged, and deflected away from an initial trajectory so that they strike the print medium in an ordered pattern. Subsequent to Sweet's original work the concept of deflecting some droplets away from the medium to a gutter evolved so that even greater droplet position control is possible.

One high speed ink jet printer proposal comprises multiple ink jet nozzles spaced across the width of a print plane. Each nozzle can throw a series or sequence of ink droplets to a specific swath or portion of the print plane so that in combination the multiple nozzles can send ink drops to any position across the plane. By translating the print medium past the nozzle array the entire print medium can be selectively encoded with ink droplets to create a permanent ink jet recording.

U.S. Pat. No. 4,255,754 to Crean et al entitled "Differential Fiber Optic Sensing Method and Apparatus for Ink Jet Recorders" discloses an ink jet system configured to include multiple ink jet nozzles spaced across the print medium's width. This system includes multiple droplet charging and deflecting electrodes which interact with droplets to deflect them to appropriate picture element locations (or pixels) on the medium. In particular, each nozzle has associated with it a charging electrode and a pair of deflection electrodes which electrostatically bend charged droplets to their intended positions or to a droplet gutter.

In this configuration, it is important for proper printer performance that each picture element is addressed by one ink jet nozzle. Stated another way, the droplets from adjacent nozzles should neither overlap nor leave gaps but instead should "stitch" together across the print plane.

Techniques are known in the art for stitching together the ink jet droplets from a multiple nozzle array. One technique is accomplished with the use of a programmable computer which both monitors and controls ink jet performance. During a calibrate mode the controller causes ink drops to follow certain specific trajectories. By observing the charging voltages that must be placed on the charging electrodes to cause the droplets to follow these calibrate trajectories, it is possible for the controller to determine and control the generation of charging voltages for other droplet trajectories.

The printing system disclosed in the above referenced Crean et al patent uses optical fibers to sense ink droplets following the calibration trajectories. A drop sensing zone is defined for each sensing site in a space between the faces of a single input fiber and two output fibers. An LED light source is coupled to a remote end of the input fiber and photosensors are connected to remote ends of each output fiber. When ink droplets enter the region between the input and output fibers the output of the two photosensors changes with time and sensing circuitry connected to the photosensors gives an indication that droplets are passing the sensing site.

Since a typical ink jet printer may include many ink nozzles spaced across the paper width, there must be many sensing sites also spaced across the paper width. Each site includes two output fibers and one input fiber which must be routed away from the sensor sites to the interpreting electronics and the LED input. In an array having many such optical fibers the mechanics of mounting and routing these optical fibers becomes burdensome. Copending U.S. patent application Ser. No. 204,443 to Houston et al filed Nov. 6, 1980 and entitled "Integrated Waveguide Drop Sensor Array and Method for Ink Jet Printing System" addresses the routing problem. In that application, the use of photofabricated light paths on an underlying substrate is disclosed. While simplifying the generation of the optical paths leading to and from the optical sensing sites, the Houston et al disclosure in no way reduces the number of those paths.

SUMMARY OF THE INVENTION

The present invention simplifies the task of routing input and output signals to and away from the optical sensors used to calibrate an ink jet printing system. In particular, the number of output fibers which must be routed away from the optical sensing sites is reduced and the input optical fibers are replaced by a much simpler input structure.

According to the invention, the ink jet printer includes a generator for directing one or more droplet streams in the direction of a print medium and electrodes for deflecting ink droplets from the one or more streams to either selected positions on the print medium or to a droplet gutter. The improved droplet sensing apparatus includes multiple sensor sites positioned in relation to the one or more ink jet streams where each site has an input including two light emitting sources and an output defining an output light path. A sensor is coupled to the output light path for sensing the passage of ink droplets between the input and the output of the sensor site. Use of two individual light emitting sources for each site avoids the necessity of routing light along an input fiber to the sensing site. Only one output path is required to transmit light signals from the sensing site to circuitry coupled to the output path for sensing the passage of ink droplets between the input and output.

According to a first embodiment of the invention, the two light emitting sources emit visible or near visible light of two different wavelengths and the circuitry coupled to the output includes a mechanism for distinguishing between the two wavelengths passing through the output. The mechanism for distinguishing between the two wavelengths is a dichroic mirror which primarily transmits the first of two wavelengths and primarily reflects the second wavelength. A photodetector responsive to the first wavelength is positioned to analyze the intensity of the transmitted light signal and a second detector which responds to the second wavelength is positioned to analyze the reflected signal. By analyzing the light intensities of the two wavelength signals, it is possible to sense the passage of ink droplets past the sensing site. In particular, the method of analyzing light intensities disclosed in the Crean et al patent referenced previously is suitable for use in combination with the present design.

Practice of the invention significantly reduces the complexity in routing of optical fibers in the vicinity of the sensing sites. The light inputs at the sensing site comprise conventional light emitting diodes rather than optical input fiber used by prior art systems. The LEDs at the multiple sensing sites are activated by a single line driver. Rather than two output fibers for each sensing site, the invention uses only a single output fiber to transmit light intensity data. The two signals received by the input to that fiber are transmitted along the fiber to their respective detectors and then separated by the dichroic mirror. This sensing technique provides definition of the optical sensing site by using multiple light inputs rather than multiple outputs as known in the prior art.

A second embodiment of the invention uses a time multiplexing LED energization scheme. This alternate embodiment also has two light sources per sensing site, but rather than emitting different wavelength light the two sources are alternately energized by a pair of line drivers. The sensing apparatus no longer includes a mirror to split wavelengths. Instead a multiplex unit alternates the output from a single photodetector to circuitry which compares the photodetector output from successive time intervals. Again the output from this circuitry is analyzed using the Crean et al method.

From the above it should be appreciated that one of the object of the invention is the simplification of the apparatus needed to define optical sensing sites in an ink jet printer. This and other objects and features of the invention will become better understood when a detailed description of a preferred embodiment of the invention is described in conjunction with the accompanying drawings.

DETAILED DESCRIPTION OF THE PREFERRED EMBODIMENT

Figure 1:
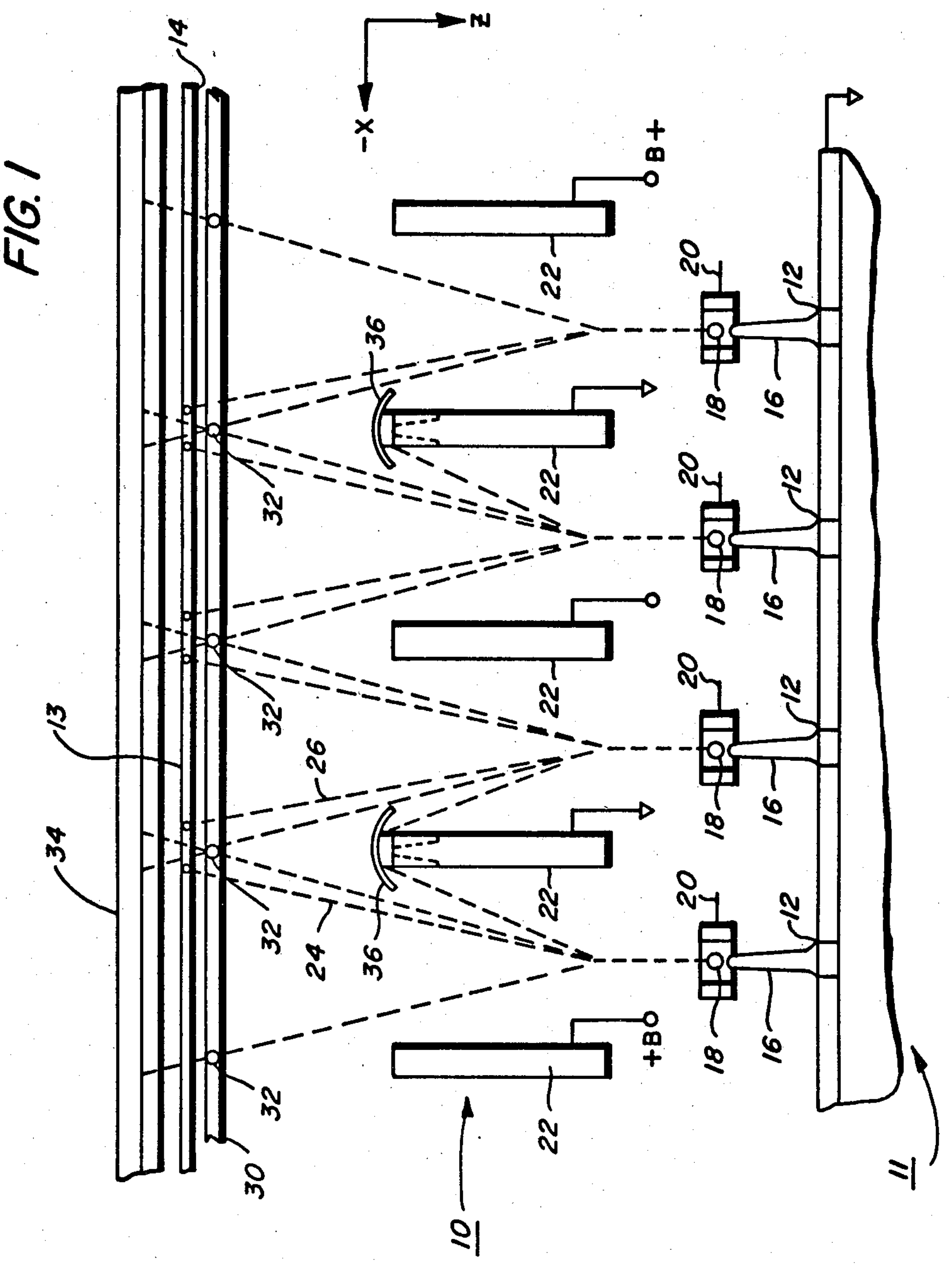
FIG. 1 is a plan view of a portion of an ink jet printer using the improved sensing apparatus comprising the present invention.

Turning now to the drawings, FIG. 1 illustrates an ink jet printer 10 comprising a drop generator 11 having a number of nozzle openings 12 through which ink under pressure is squirted in the direction of a recording medium 13. The recording medium has a surface facing the generator 11 which defines a print plane 14. During printing the medium 13 travels past the printer 10 and ink drops from the generator strike the medium to encode information on the print surface.

The illustrated printer 10 is of a bi-polar scanning type wherein the ink droplets from each nozzle 12 can be deflected away from their initial trajectory to specific portions of the print plane 14. An excitation mechanism not shown in FIG. 1 is coupled to the printer 10 to generate pressure waves within the ink emitted from the nozzles 12 to insure that the ink columns 16 emitted from those nozzles break up into individual droplets 18 at a well defined distance from the nozzle plane. At this point of droplet formation, a series of charging electrodes 20 are positioned to electrostatically induce a net charge on the droplets 18 as they are formed. The droplets 18 then continue in their path toward the print plane 14 passing through a region bounded by electric field generating electrodes 22. These field generating electrodes cause an electric field to be set up through which the charged ink droplets must pass in their trajectory towards the print plane 14. It should be noted in FIG. 1 that alternate ones of the electrodes 22 are grounded and that the non-grounded electrodes are maintained at a positive voltage +B on the order of 200 volts. Once the charged droplets 18 enter the electric field created by the electrodes 22, their trajectory is affected due to the electrostatic forces acting on the charge they carry.

The specific trajectories through which the charged droplets are deflected depends on the charge induced at the droplet break-off point by the charging electrodes 22. By way of example, the left most pair of field generating electrodes 22 generates an electric field in the positive X direction as that direction is defined by the coordinate system located on the right of FIG. 1. Positively charged droplets entering that field are deflected in the positive X direction and negatively charged droplets in the negative X direction.

In ink jet printing where an entire width of a recording medium is to be selectively encoded with information, it is vital to the performance of the printer that ink droplets from the multitude of nozzles spaced across the ink jet printer array are capable of sending droplets to every segment across the print medium's width. Due to the complexity of the charging and deflecting electronics utilized in a typical ink jet printer, it is a non-trivial task to insure that the droplet generated by the multitude of ink nozzles 12 "stitch" together to insure this coverage.

Properly stitched ink jet trajectories are shown in FIG. 1. The right most droplet printed by the first nozzle in the array segment follows a trajectory 24 which causes it to strike the print plane 14 at a position in close proximity yet not overlapping the position which the next nozzle covers by causing its ink droplets to follow its left most print trajectory 26. Along the entire length of the array, adjacent nozzles must accurately deflect ink droplets so that neither overlap or gaps are left between areas of nozzle coverage.

To facilitate the calibration and therefore accurate stitching of the disclosed ink jet printer, the printer includes a sensor strip 30 along which are mounted a number of sensors 32 for sensing droplet passage to the print medium. In a so called calibrate mode of operation, the printer 10 causes ink droplets to travel a trajectory across a sensor 32. The sensor 32 is, in turn, coupled to electronics for sensing ink droplet position and speed. It should be recalled that the degree with which the ink droplets are deflected by the deflecting electrodes in a function of charge placed on those droplets at the point of droplet breakoff. If the charging voltage necessary to deflect the droplets directly over one of the sensors 32 is known, it is a matter of mathematical interpolation to calculate the appropriate charging voltages necessary to cause ink droplets from a given nozzle to follow trajectories leading to specific portions of the print plane 12. The printer controller calibrates each ink jet nozzle spaced across the array width by causing ink droplets to follow trajectories over the sensors 32 and utilizing the information gathered during this calibrate mode, appropriate changes or modifications are made in the charging electrode voltages to insure properly stitched images are formed.

During the calibrate mode of operation, no recording medium follows the path defined by the print plane and accordingly those droplets passing over the sensors 32 must be collected by a gutter 34 mounted behind the print plane 14. During actual ink jet operation, those ink droplets which are generated but are not intended to strike the print medium are directed to droplet gutters 36 forming part of alternate ones of the field generating electrodes 22. Those droplets intended to be caught by the gutter 36 are more highly charged than any other droplets generated by the jet printer 10. It is believed the foregoing is adequate for a general description of the ink jet printer. A more detailed description of a typical bi-polar printer may be found by reference to copending application Ser. No. 296,922 to Crean et al filed Aug. 27, 1981 which is expressly incorporated herein by reference.

Figure 2:
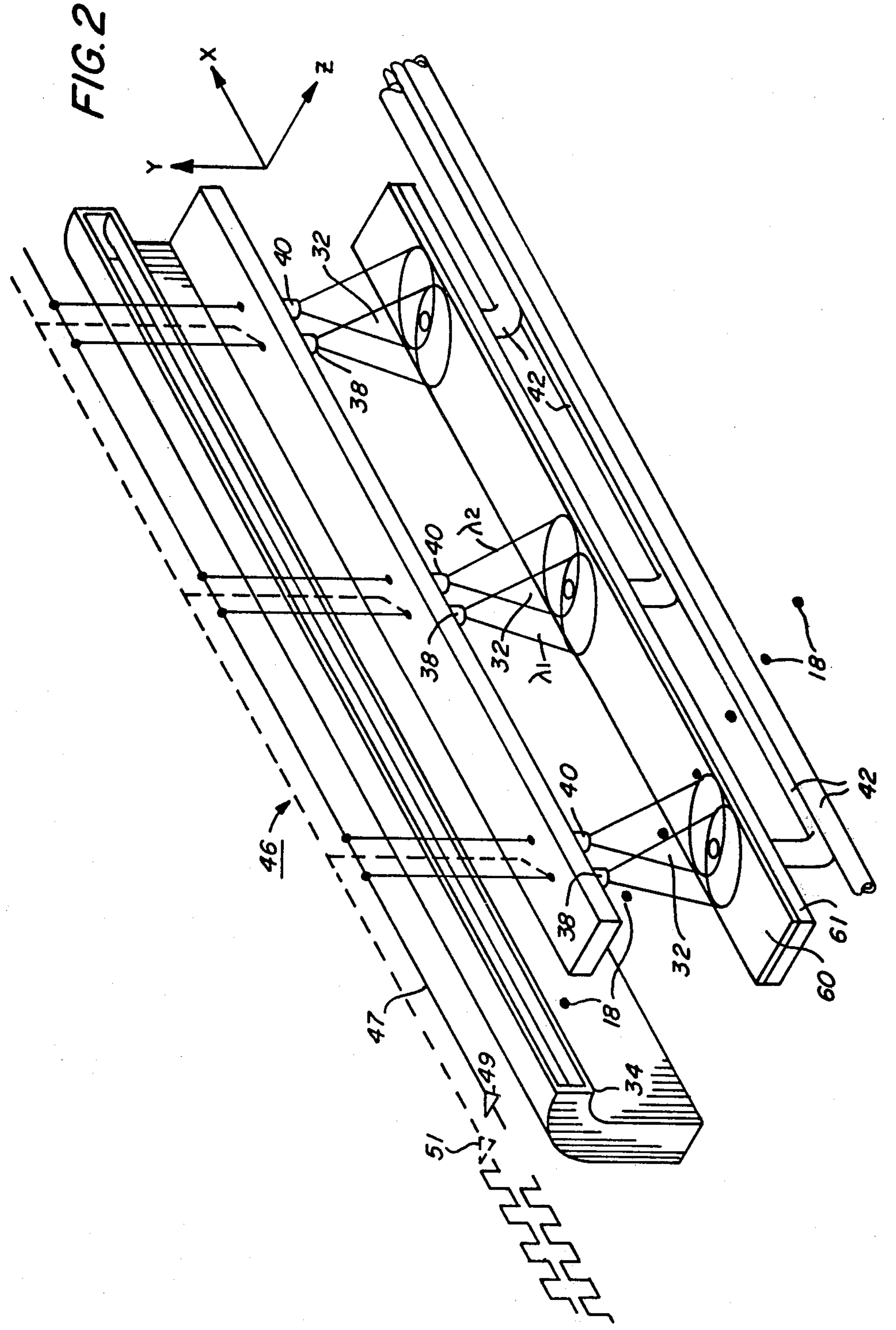
FIG. 2 is a schematic isometric view showing an input and output for the sensing sites of the FIG. 1 printer.

The present invention relates specifically to the method and apparatus for sensing droplet passage past the sensor sites 32. An arry of sensor sites as defined by the present invention is illustrated schematically in FIG. 2. A coordinate axis consistent with the axis shown in FIG. 1 is also illustrated in FIG. 2 to better illustrate the orientation of these sensing sites with respect to the printer. Ink droplets are generated and charged so that they deflect generally along the X direction as defined by the coordinate axis. Although the deflection is in this positive or negative X direction, the largest component of droplet velocity is in the negative Z direction as defined by that coordinate system. As illustrated in FIG. 2, each sensor sites comprises two light sources 38,40 such as electrically energizable light emitting diodes and a single fiber optic light pipe 42 leading away from the sensor sites 32 to form a fiber optic output bundle. Suitable LEDs are available from Hewlett Packard of Palo Alto, Calif. and designated by parts no. 5082-4100/4101 (red), 5082-4160 (high efficiency red), 5082-4150 (yellow), and 5082-4190 (green). The light sources 38,40 preferably generate light signals of different wavelengths during printer calibration. The LEDs are energized by a drive bus 47 which runs along the sensor array width. The single bus is coupled to an amplifier 49 which provides a signal of sufficient strength to simultaneously energize all LEDs along the array.

Figure 3:
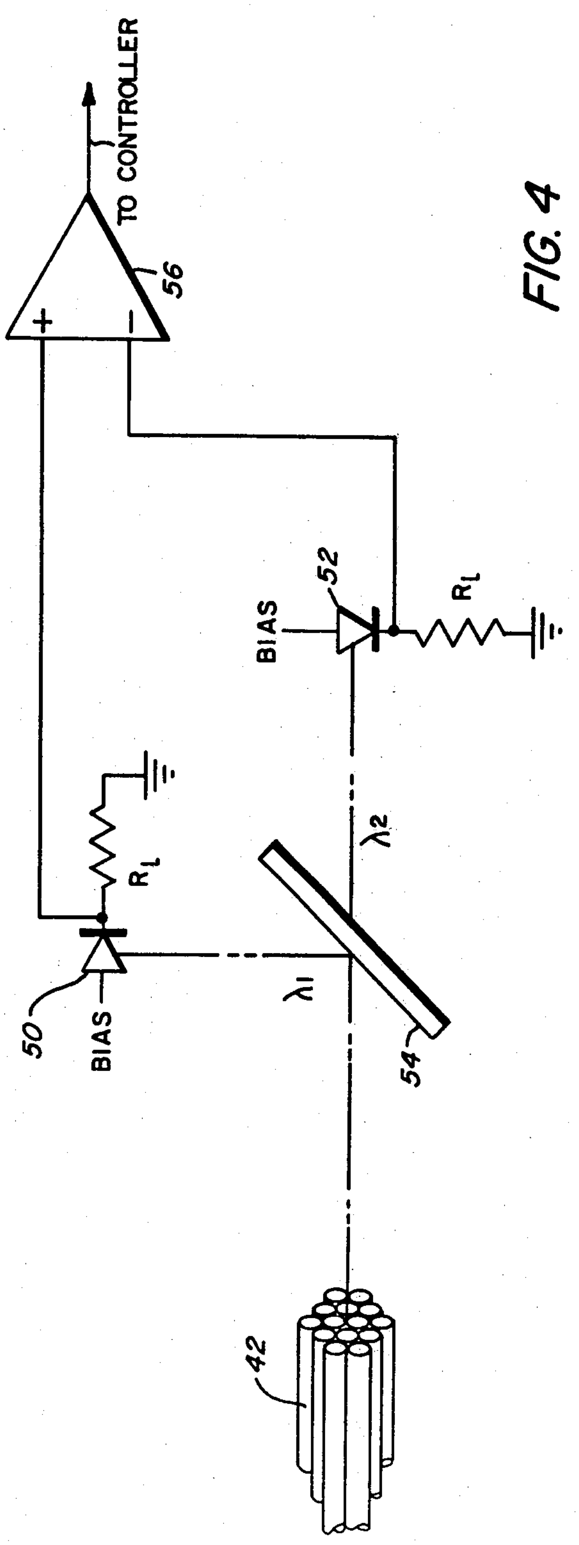
FIG. 3 is a schematic of a sensor output showing means for sensing ink drop passage through a sensing zone.

The output light pipes 42 are routed together as a bundle away from the sensing sites to an optical detector assembly 44 illustrated in FIG. 3. In operation, the system controller causes the droplets to be charged with a varying charge until the output from the detector assembly indicates a charged droplet stream passes the sensing zone directly over the output pipe 42 of a given sensing site 32. When this occurs, the controller knows the charging voltage placed on the droplets to deflect to this specific trajectory and therefore can interpolate the charging voltages for other trajectories. The calibration process continues for each nozzle until the entire array width has been calibrated.

Since two light signals of different wavelengths are simultaneously generated by the two LEDs, it is necessary to unscramble the light signals transmitted to the output light pipes 42. The preferred technique is to sense the outputs from the sensing sites with two photodetectors 50,52 (FIG. 3) wherein a first of the photodetectors 50 is responsive to a first wavelength generated by the left hand light emitting diodes 38 and a second detector 52 is responsive to the second wavelength as generated by the right hand light emitting diodes 40. DT series silicon photodiodes from the EG&G Electrooptics Company, 35 Congress St., Salem, Mass. 01970 are suitable detectors. The detectors 50,52 are preferably separated so it is necessary to split the light signal from the output fibers 42 with the use of a dichroic splitter mirror 54 positioned in close proximity to the fiber output. One suitable beam splitter mirror may be selected from a visible variable bandpass interference set product number 03 VBS 001 from the Melles Griot Company, 1770 Kettering St., Irvine, Calif. 92714.

Once the light has been split up into its two components, it is possible to detect the intensity of the light, and transmit electrical signals related to that intensity to a difference amplifier 56 which, in turn, generates an output corresponding to the difference in light intensities as generated by the photodetectors 50,52. Utilizing techniques known in the art, it is then possible to analyze the position of the ink droplets as they pass in the vicinity of the sensing sites 32 as a function of time. The specific technique for doing this analysis is disclosed in U.S. Pat. No. 4,255,754 to Crean et al which is incorporated herein by reference.

For a discussion of one technique for mounting the output fibers in close proximity to the sensing sites 32, the reader is directed to copending U.S. patent application Ser. No. 314,634 to Houston et al filed Oct. 21, 1981 which is also incorporated herein by reference. Briefly, that application discloses the electroforming of an aperture mask 60 onto a mounting jig 61 which holds the fibers 42 in place at the sensing sites.

It should be appreciated that the size of the LED pairs at each sensing sites 32 must be small and that the spacing between LED sources is on the order of a droplet diameter or approximately 3 mils. The light emitting surface from the diode must have a diameter approximating this value or to even more clearly define the sensing zone the emitting region should be smaller than this value.

An alternate technique is invisioned for separating light signals from the left and right hand light emitting diodes 38,40. According to this technique it is possible to multiplex in time the light from the diodes in synchronism with the detection electronics. As an example, if the left hand diodes are cycled on and off several times during the droplet transit time, while the right hand diodes are cycled similarly but out of phase with the left hand diodes, a single detector can be used to sense the light from the fiber optic bundle. This detector synchronously detects the right and left components from the LEDs which are then fed to an appropriate difference amplifier using techniques known in the art.

Figure 4:
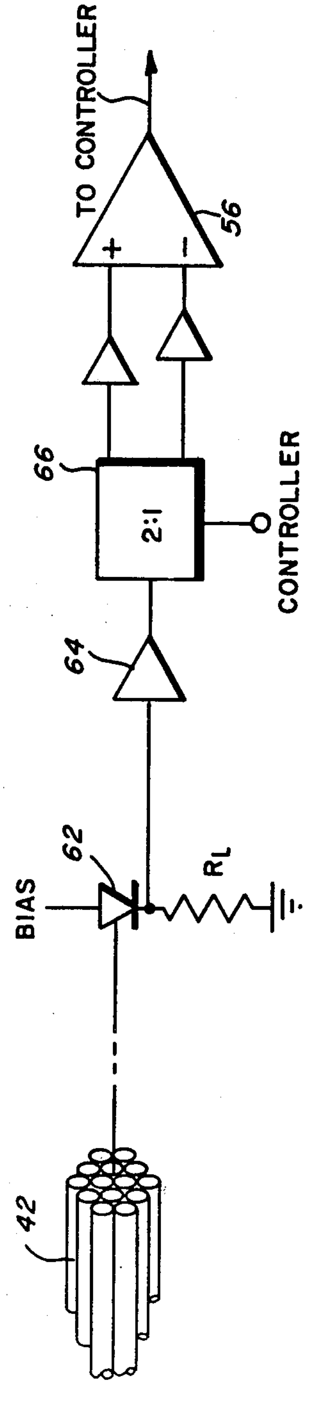
FIG. 4 is a schematic of circuitry for sensing ink droplet position using time multiplexed LEDs.

Circuitry for sensing ink droplet position using time multiplexed LEDs is shown in FIG. 4. For this technique two LED energization busses 46,47 are required with accompanying amplifiers 49,51. The inputs to the two busses 46,47 are multiplexed so that all right hand LEDs 40 are energized and then all left hand LEDs 38 are energized.

The output from all sensing sites are transmitted to a photodetector 62 by the fibers 42. The photodetector 62 outputs a signal which is amplified by an amplifier 64 and then multiplexed by a 2:1 multiplexer unit 66, depending on which set of LEDs (right or left) generated the light causing the signal. Signal switching in the multiplex unit 66 is performed by a controller which coordinates the on/off cycle of the LEDs with this multiplexing. The multiplexed signal is stored in one of two sample and hold circuits 68 which lead to the difference amplifier 56. In this way, the amplifier inputs represent light intensities from the right and left LEDs respectively. By comparing these intensities and using the analysis techniques disclosed in the Crean et al patent the position of ink droplets can be calculated.

According to either technique it is necessary that the electronics include some mechanism for distinguishing between light signals from the two LEDs 38,40. So long as this is accomplished, a single output fiber 42 can be routed away from the sensing sites to the vicinity of the analysis circuitry thereby obviating some of the routing problems associated with prior art systems. The use of small electronically actuated LEDs to define the sensing sites also simplifies the sensing region input apparatus.

The preferred embodiment of the invention has been described with a degree of particularity, but it is the intent that all modifications and/or changes falling within the spirit or scope of the appended claims be covered.

What is claimed is:

1. In an ink jet printer which includes a generator for directing one or more droplet streams to a print medium and means for deflecting ink droplets from said one or more streams to either selected positions on the print medium or to a droplet catcher, improved droplet sensing apparatus comprising sensor sites positioned in relation to said one or more streams, each site including an input for directing two light signals through a sensing zone, an output comprising a light path for transmitting two light signals away from said sensing zone, and means coupled to said light path for sensing the passage of ink droplets through said zone by measuring the intensity of said two signals.

2. The printer of claim 1 wherein said input comprises two light emitting sources for emitting visible or near-visible light of two different wavelengths and said means for sensing comprises means for distinguishing between the two wavelengths passing through the output.

3. The printer of claim 2 wherein said means for distinguishing comprises a dichroic mirror which primarily transmits a first of said two wavelengths and primarily reflects a second of said two wavelengths; said mirror placed to receive light transmitted by said output to split said light into its two wavelength components.

4. The printer of claim 1 wherein each input comprises two light emitting sources for emitting visible or near-visible light in a time multiplexed fashion and said means for sensing comprises means for comparing the time multiplexed outputs from said light emitting sources.

5. The printer of claims 2 or 4 wherein said two sources comprise light emitting diodes and said output comprises a fiber optic light pipe.

6. In ink jet printing, a method for sensing droplet passage past a sensing site comprising the steps of:

directing light from two light sources through a region through which ink droplets pass in flight;

sensing the passage of light through said region; and determining the positioning of ink droplets in said region by comparing the intensities of light from said two sources.

7. The method of claim 6 wherein in the directing step two different wavelength lights are transmitted through said region simultaneously and in the sensing step the two wavelength lights are separated prior to determining their intensity.

8. The method of claim 6 wherein the directing step includes a time multiplexing function wherein light from said two sources is alternately transmitted through said region.

9. In ink jet printing, apparatus for sensing droplet travel past a sensing site comprising:

means for directing two different wavelength light signals through a region which defines said sensing site;

means for sensing the passage of said two light signals through said region; and means for determining the positioning of ink droplets in said region by comparing the intensities of said two light signals.

10. The apparatus of claim 9 wherein said means for sensing comprises:

an optical fiber for receiving light signals passing through said region and transmitting said signals along an output path, and a dichroic mirror for splitting said light signals from said optical fiber into said two different wavelengths for analysis by said means for determining.

11. The apparatus of claims 9 or 10 wherein the means for determining comprises a comparator circuit coupled to two photodetector circuits which convert said two light signals into electrical signals for comparison by said comparator circuit.

* * * * *